United States Patent [19]

Hoff et al.

[11] 4,016,343
[45] Apr. 5, 1977

[54] TETRAVALENT CHROMIUM ALKOXIDE POLYMERIZATION CATALYST AND METHOD

[75] Inventors: Raymond E. Hoff, Palatine; Mitsuzo Shida, Barrington, both of Ill.

[73] Assignee: Chemplex Company, Rolling Meadows, Ill.

[22] Filed: Aug. 22, 1975

[21] Appl. No.: 607,012

[52] U.S. Cl. .............................. 526/96; 252/431 R; 526/106; 526/130; 526/154; 526/172
[51] Int. Cl.² ..................... C08F 4/78; C08F 10/00
[58] Field of Search .......... 526/106, 130, 154, 172, 526/96; 252/431 R

[56] References Cited
UNITED STATES PATENTS

| | | |
|---|---|---|
| 3,285,891 | 11/1966 | Aftandilian ........................ 526/130 |
| 3,326,877 | 6/1967 | Orzechowski et al. ............ 526/130 |
| 3,642,749 | 2/1972 | Johnson et al. ................... 526/130 |
| 3,694,422 | 9/1972 | Long ................................. 526/130 |
| 3,862,104 | 1/1975 | Witt ................................... 526/106 |

*Primary Examiner*—Alan Holler
*Attorney, Agent, or Firm*—Wegner, Stellman, McCord, Wiles & Wood

[57] ABSTRACT

A catalyst for polymerizing one or more 1-olefins prepared by activating with a dry gas that contains oxygen a mixture of a finely divided support and a tetravalent alkoxide of chromium. The disclosure also includes the method of making the catalyst and methods of polymerizing olefins with the catalyst.

18 Claims, No Drawings

TETRAVALENT CHROMIUM ALKOXIDE POLYMERIZATION CATALYST AND METHOD

BACKGROUND OF THE INVENTION

This invention relates to a new catalyst, a method of making the catalyst and a method of making polyolefins with the catalyst in which the catalyst is prepared by activating with a dry gas that contains oxygen a mixture of a finely divided support and a tetravalent alkoxide of chromium on the support.

SUMMARY OF THE INVENTION

This invention includes a catalyst that is active for polymerizing olefins prepared by activating a mixture of a support that is preferably silica, alumina, zirconia, thoria or composites thereof and a tetravalent alkoxide of chromium wherein the activating is with a dry gas that contains oxygen and the support is substantially dry before mixing with the alkoxide.

These new catalysts have advantages with respect to activation temperature, ease and economy of catalyst preparation, and properties of the polymers produced. The novel type of chromium compounds consists of the alkoxides of tetravalent chromium, especially tertiary alkoxides such as chromium tetra-t-butoxide and hindered secondary such as tetrakis (3,3-dimethyl-2-butoxy) chromium.

The catalysts of this invention are made by depositing upon a suitable support material one or more of these alkoxides and then activating the combination by heating in an oxygen containing gas such as a stream of air or a mixture of oxygen with an inert gas. The temperature of the activation may be as low as 200° C. but higher temperatures up to the sintering temperature of the support are entirely satisfactory. In one embodiment of this invention, the lower activation temperature makes it possible to make high density polyethylene, for example, of greatly increased melt index in either a particle form or solution process. Other advantages will become clear upon comparison with the catalysts described in the existing patents.

The catalysts of this invention are active for olefin polymerization without the use of an organometallic compound activator or cocatalyst such as alkyl aluminum. Known chromium catalysts which are active in this manner are different from those of this invention and generally belong to four classes on the basis of the properties of the chromium compounds employed.

One important class of these prior catalysts is principally disclosed in U.S. Pat. No. 2,825,721. In the preparation of the catalysts of this patent, the chromium compounds suggested for use are totally inorganic, mostly water soluble, saltlike and of low volatility, and in addition the chromium in these compounds is either trivalent or hexavalent. For example, in column 4, line 10, the patent states that the catalyst can be prepared using "as starting materials, chromium trioxide, chromic nitrate, chromic acetate, chromic chloride, chromic sulfate, ammonium chromate, ammonium dichromate, or other soluble salts of chromium". The word "soluble" obviously means soluble in water. One of the suitable compounds is deposited by any effective method upon a support of silica, alumina, zirconia, or thoria, and the combination must be activated by heating preferably in a stream of gas. The activation temperature is in the range of 450°–1500° F., preferably from 750°–1500° F.

There are several other patents which deal with modifications or improvements of this kind of catalyst. These patents describe the catalyst preparation in a similar way. Examples of these patents, all assigned to the Phillips Petroleum Company, are U.S. Pat. Nos. 2,959,577; 2,959,578 and 2,969,348. In U.S. Pat. No. 3,130,188 the description as soluble in water is omitted from the end of the listing of suitable chromium compounds, and the poorly soluble chromium carbonate is included in the list.

In U.S. Pat. No. 3,172,882 chromous fluoride and chromic fluoride are the two compounds mentioned and aqueous impregnation of the support is the preferred method to make the catalysts.

A second class of catalysts is made from trivalent, hexavalent or zero valent chromium compounds which have organic substituents and some solubility in organic solvents. U.S. Pat. No. 3,349,067 discloses catalysts made from chromium compounds of this type. The advantage asserted is that higher activity is obtained at lower chromium levels and especially lower activation temperatures. An explanation for the advantage is given in column 1, lines 52–66. The solubility properties of these chromium compounds makes it possible to distribute the chromium upon the support by impregnation with an organic solvent solution, or precipitation from such solution. Consequently, the support can be heat treated and then the chromium compound can be added anhydrously. Exposure of the chromium to the high temperature necessary to dehydrate the support can be avoided. Suitable chromium compounds are the alkyl and aryl esters of chromic acid, chromium acetylacetonate and chromium arene complexes. The inventor prefers the propyl, butyl and amyl esters. A solution of chromium trioxide in acetic anhydride, or such solution diluted with carbon tetrachloride may also be used. Somewhat the same advantage is noted in U.S. Pat. No. 3,346,511. In this case, however, the chromium compound is chromyl chloride and the method of putting it upon the support is by vaporization.

On the basis of solubility properties the organosilyl chromate esters of U.S. Pat. No. 3,324,101 belong in a class with U.S. Pat. No. 3,349,067. The catalysts are different, however, in that thermal activation after addition of the silyl chromate ester is not necessary. The silyl chromate esters contain chromium in the hexavalent state.

A third group of catalysts are those which use chromocene and its derivatives. These catalysts are referred to in U.S. Pat. No. 3,687,920 and are described more completely in German Pat. No. 1,808,388 and Belgian Pat. No. 723,775. Chromocene compounds contain chromium in the divalent state.

A fourth group of catalysts use as ingredients zero valent arene complexes. Examples of these patents are U.S. Pat. Nos. 3,757,002 and 3,157,712 and the main compounds are dicumene chromium and dibenzene chromium.

To our knowledge the only references to catalysts using tetravalent chromium compounds are U.S. Pat. Nos. 3,666,743 and 3,694,422. The catalysts of these patents are not made from chromium alkoxides and are completely different from the catalysts of our invention in several ways. One of the differences is that these two patents reveal the use of tetra alkyl chromium compounds instead of alkoxides. Secondly, the catalysts thus formed are activated by an organoaluminum compound or light irradiation or both. Neither patent recognizes the advantages possible with alkoxides and air activation.

The employment of the tetravalent alkoxides of chromium to make the catalysts of this invention results in catalysts with the following advantages:

1. Low temperature activation is now possible when desired.

2. The production of high density polyethylene of greatly increased melt index (ASTM D-1238 52T). A practical significance of this aspect is that resins can be made in the economical particle form process for applications requiring high flow in fabrication. Generally, this has not been possible with existing catalysts. Higher melt index resins result when the catalysts of this invention are made using a titanated support, e.g. silica.

3. The tetravalent alkoxides of chromium are stable and non-explosive. In order to achieve the advantage noted in paragraph (1) above, U.S. Pat. No. 3,349,067 suggests the use of esters of chromic acid. These esters have poor stability under the best of conditions and their isolation in the solid state is a hazardous operation because of possible explosion. Chromium tetra-t-butoxide, on the other hand, can be safely isolated as a solid and even distilled. When protected from light and the atmosphere the tetravalent alkoxide has notable stability. We have successfully made catalysts with a solution of tetra-t-butoxide 1 year after its preparation.

4. Because it is possible to isolate the solid chromium tetra-t-butoxide, for example, and because of its low melting point of 39° C., melt coating of the chromium compound upon the support is possible. Thus melted chromium tetra-t-butoxide can be directly added to a fluidized bed of catalyst support. Alternatively, a concentrated solution or dilute solution can be so added. Large amounts of solvents and separate solvent impregnation steps are unnecessary.

5. Chromium tetra-t-butoxide has sufficient volatility to permit deposit upon the support by vaporization. The only other commonly known chromium compounds which are volatile enough for vapor deposition at relatively low temperatures are chromyl chloride and chromyl fluoride, both hexavalent and extremely corrosive. Furthermore, the halogens in these compounds alter catalyst properties.

DESCRIPTION OF THE PREFERRED EMBODIMENTS

The catalysts of this invention are made by depositing upon a support material an alkoxide of tetravalent chromium and subsequently activating the combination by heating in a stream of air, or a mixture of oxygen and inert gases such as nitrogen, helium or carbon dioxide. The alkyl groups of the alkoxide are preferably tertiary such as t-butyl, or hindered secondary such as 3,3-dimethyl 2-butoxy. Ordinarily, the four alkyl groups will be the same but this is not necessary. The support material can be any of the groups generally used for chromium catalysts such as silica, alumina, zirconia and thoria and composites thereof. A high pore volume silica such as Davison grade 952 which has been treated to contain up to 10% titanium is particularly favored. The temperature of the activation can be from 200°–1000° C., but a key feature of our invention is that good activity is obtained at the lower end of this range.

Where the activation temperature is adjacent to the lower end of this range such as from about 200°–400° C. the high density polyethylene that is produced has surprisingly increased melt index over the polyethylene produced at the upper end of this range. In addition, the polymerization may be in either a particle form or solution process.

The tetravalent alkoxide of chromium used in preparing the catalyst of this invention is used in an amount to give about 0.1–10 weight percent of chromium on the support. The alkoxide is of the formula

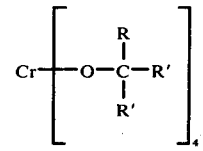

wherein R is hydrogen or an alkyl group of 1–6 carbon atoms, R' is an alkyl group of 1–6 carbon atoms and all R' may be the same or different. Also, each alkyl group may be straight chain or branched with an excellent example of a branched chain being isopropyl.

As stated earlier, when the catalysts are prepared with a titanated support such as a titanated silica the polymers produced have higher melt indexes. These titanated supports may be prepared by initially treating the support with a titanium compound which may be one selected from the following formulas:

$(R')_n Ti(OR')_m$,
$(RO)_m Ti(OR')_n$,
$TiX_4$,
$TiO_2$,
titanium acetyl acetonate compounds,
alkanolamine titanates in which $m$ is 1, 2, 3 or 4, $n$ is 0, 1, 2 or 3 and $m$ plus $n$ equals 4; and R is selected from alkyl, aryl, cycloalkyl and alkaryl, each group having 1 to 12 carbon atoms; R' is selected from the group consisting of R, cyclopentadienyl and alkenyl, for example ethenyl, propenyl and isopropenyl, each group having 1 to 12 carbon atoms; and X is halogen, preferably chlorine. When more than one R (or R') group occurs in the titanium compound the groups can be the same or different. Titanium compounds represented by the formula $(RO)_4 Ti$ are preferred, particularly the alkyl compounds having from 1 to 6 carbon atoms in each alkyl group, for example tetraethyl titanate and tetraisopropyltitanate. The titanium acetyl acetonate compound can be, for example, titanium diacetylacetonate di-isopropylate, titanium dichloro diacetyl acetonate or the so-called "titanium acetyl acetonate", "titanyl acetyl acetonate". The alkanolamine titanate can be, for example, triethanolamine titanate.

The quantity of titanium compound used in the process of the present invention is suitably in the range of 0.5–8.0% based on the weight of the support material, and preferably in the range of 2.0–6.0%. It is believed that during the first step of the catalyst preparation of the present invention the titanium compound is chemisorbed by the support material. This is supported by the fact that when an excess of a volatile titanium compound such as isopropyl titanate is refluxed in the presence of the support material (e.g. silica) and then the reflux condenser is removed, a quantity of the titanium compound does not volatilize. This quantity is in general found to be approximately constant for a given support material and titanium compound.

Most preferably the quantity of titanium compound used in the present invention is the maximum amount that can be chemisorbed by the support material.

Suitably the titanium compound is mixed in the absence of moisture with the support. This may be achieved in any convenient manner, for example by dry mixing, by ball milling, by dissolving the titanium compound in a suitable inert non-aqueous solvent, e.g. petroleum ether, mixing the solution with the support and evaporating off the solvent, or by incorporating the titanium compound as a solid, liquid or vapor into a fluidized bed of the support material, for example, by passing the vapor of the titanium compound into the fluidizing gas.

The support material and the titanium compound are heated together at a temperature in the range of 150°–1200° C. and preferably 400°–1000° C., most preferably 500°–900° C., for a period of time which can range from a few minutes to several hours. The heating may be carried out, for example, by heating the mixture in a fluidized bed through which dry gas (e.g. air) is passing or by fluidizing a bed of the heated support material using a mixture of dry gas and vapor of the titanium compound.

The catalysts of this invention may be used to polymerize one or more olefins having from 2–8 carbon atoms and includes such 1-olefins as ethylene, propylene, 1-butene, 1-pentene, 1-hexene, 4-methyl-1-pentene, 1-octene, butadiene, isoprene, piperylene, 1-3-octadiene, etc. as well as copolymers of two or more of the monomers.

EXAMPLE 1

A sample of Davison 952 silica weighing 8.8 grams was charged into a quartz tube of one inch diameter having a fritted disc to hold the silica and allow fluidization. Nitrogen was passed upwardly through the tube at 300 cm$^3$/min. while the temperature was raised to 150° C. and held for 70 minutes. Then 2.1 ml of titanium tetraisopropoxide was added by means of a hypodermic syringe and long needle to the top of the fluidized bed. Then, while passing air through the tube for fluidization, the temperature was increased to 730° C. for 10 minutes. The silica was cooled to 100° C. A 2.45 ml volume of a benzene solution of chromium tetra-t-butoxide was then added, again by long needle and syringe, to the top of the fluidized bed. The temperature was raised to 300° C. and held for 17 hours, 20 minutes. The calculated titanium content of the catalyst was 4.2% and the chromium content 0.8%.

This example illustrates the method where titanium is added to the dried support prior to mixing with the chromium alkoxide. As noted in the example, the chromium tetra-t-butoxide was added in the form of a benzene solution thereof. Any of the customary solvents may be used, as desired.

The catalyst so produced was tested in polymerization reactors at 107° C. and 550 psig (particle form conditions). Isobutane was the diluent or solvent. In one test the yield was 52 grams and the polyethylene was in the form of large particles, 1–2 mm in diameter. The melt index was 115. In a second test similar large particles were produced having a melt index of 96. In the third test the yield per gram of catalyst was 1160, and the polyethylene had a melt index of 25. Unmodified catalysts of the type of U.S. Pat. No. 2,825,721, generally called Phillips catalysts, yield resins with melt indexes of 0.5 or less under these conditions of synthesis.

EXAMPLE 2

A second catalyst was prepared following the same procedure as in Example 1. In this case the weight of the Davison 952 silica was 8 grams. It was dried by heating for 30 minutes at 170° C. under nitrogen fluidization. Again, 2.1 ml of titanium tetraisopropoxide was added to the fluidized bed after the drying period. The temperature of the bed was then increased to about 700° C. and held for 15 minutes. After cooling under nitrogen to 100° C. 2.45 ml of benzene solution of chromium tetra-t-butoxide was added. The catalyst was then activated in air fluidization at 200° C. for 20 hours. A polymerization test was conducted as described in Example 1. The melt index of the polyethylene produced was 4.4 and the reactivity was 110 grams per gram of catalyst per hour.

EXAMPLE 3

A third catalyst was made by the procedure described. In this case, no titanium ester was added to the Davison 952 silica. Before introduction of the chromium tetra-t-butoxide the silica was dried at 550° C. for 15 minutes. The activation temperature was 300° C. and the time 18 hours and 20 minutes. A total of 85 grams of particle form polyethylene was made by 0.1050 gram of the activated catalyst in 160 minutes. The melt index of this polyethylene was 0.07.

Having described our invention as related to the embodiments set out herein, it is our intention that the invention be not limited by any of the details of description, unless otherwise specified, but rather be construed broadly within its spirit and scope as set out in the appended claims.

We claim:

1. A catalyst for polymerizing one or more 1-olefins to a high density polymer, prepared by (1) forming a mixture of a finely divided support selected from the group consisting of silica, alumina, zirconia, thoria and composites thereof and at least one tetravalent alkoxide of chromium in an amount to give about 0.1–10 weight percent chromium on said support, said alkoxide being of the formula

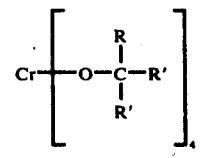

wherein R is hydrogen or an alkyl group of 1–6 carbon atoms, R' is an alkyl group of 1–6 carbon atoms and all R' may be the same or different, and (2) activating said mixture of support and alkoxide with a dry gas that contains oxygen.

2. The catalyst of claim 1 wherein at least one R or R' is a hindered secondary alkyl group.

3. The catalyst of claim 1 wherein said support is initially dried by fluidizing with a dry gas inert to said support at a water expelling temperature.

4. The catalyst of claim 1 wherein said support is modified prior to (1) by mixing the support and a titanium compound and heating at a temperature of about 150°–1200° C.

5. The catalyst of claim 1 wherein said mixture is activated at a temperature of from about 200° C. to the sintering temperature of said support.

6. The catalyst of claim 5 wherein said temperature is from about 200°–1000° C.

7. The method of making a catalyst for polymerizing one or more 1-olefins to a high density polymer, comprising: (1) forming a mixture of a finely divided support selected from the group consisting of silica, alumina, zirconia, thoria and composites thereof and at least one tetravalent alkoxide of chromium in an amount to give about 0.1–10 weight percent chromium on said support, said alkoxide being of the formula

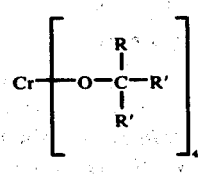

wherein R is hydrogen or an alkyl group of 1–6 carbon atoms, R' is an alkyl group of 1–6 carbon atoms and all R' may be the same or different, and (2) activating said mixture of support and alkoxide with a dry gas that contains oxygen.

8. The method of claim 7 wherein at least one R or R' is a hindered secondary alkyl group.

9. The method of claim 7 wherein said support is initially dried by fluidizing with a dry gas inert to said support at a water expelling temperature.

10. The method of claim 7 wherein said support is modified prior to (1) by mixing the support and a titanium compound and heating at a temperature of about 150°–1200° C.

11. The method of claim 7 wherein said mixture is activated at a temperature of from about 200° C. up to a temperature short of the sintering temperature of said support.

12. The method of claim 11 wherein said temperature is about 200°–1000° C.

13. The method of making polymers of one or more 1-olefins, comprising: polymerizing said olefin under polymerizing conditions with the catalyst of claim 1 and recovering the resulting polymer.

14. The method of making polymers of one or more 1-olefins, comprising: polymerizing said olefin under polymerizing conditions with the catalyst of claim 2 and recovering the resulting polymer.

15. The method of making polymers of one or more 1-olefins, comprising: polymerizing said olefin under polymerizing conditions with the catalyst of claim 3 and recovering the resulting polymer.

16. The method of making polymers of one or more 1-olefins, comprising: polymerizing said olefin under polymerizing conditions with the catalyst of claim 4 and recovering the resulting polymer.

17. The method of making polymers of one or more 1-olefins, comprising: polymerizing said olefin under polymerizing conditions with the catalyst of claim 5 and recovering the resulting polymer.

18. The method of making polymers of one or more 1-olefins, comprising: polymerizing said olefin under polymerizing conditions with the catalyst of claim 6 and recovering the resulting polymer.

* * * * *